United States Patent
Bailloeul et al.

(10) Patent No.: US 8,232,996 B2
(45) Date of Patent: Jul. 31, 2012

(54) IMAGE LEARNING, AUTOMATIC ANNOTATION, RETRIEVAL METHOD, AND DEVICE

(75) Inventors: Timothee Bailloeul, Beijing (CN); Caizhi Zhu, Beijing (CN); Yinghul Xu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 665 days.

(21) Appl. No.: 12/468,423

(22) Filed: May 19, 2009

(65) Prior Publication Data

US 2009/0289942 A1 Nov. 26, 2009

(30) Foreign Application Priority Data

May 20, 2008 (CN) ............................ 2008 1 0100721

(51) Int. Cl.
*G06T 11/20* (2006.01)
*G06F 15/16* (2006.01)
(52) U.S. Cl. .................. 345/440; 345/440.1; 345/440.2; 345/441; 345/442; 345/419; 345/422; 345/427; 707/728; 707/737; 382/164
(58) Field of Classification Search .......... 345/440–442, 345/419–427; 382/164; 707/728–737
See application file for complete search history.

(56) References Cited

U.S. PATENT DOCUMENTS 7,698,332 B2 * 4/2010 Liu et al. ........................ 707/728

OTHER PUBLICATIONS

Gustavo Carneiro, Antoni B. Chan, Pedro J. Moreno, Nuno Vasconcelos, Supervised Learning of Semantic Classes for Image Annotation and Retrieval, IEEE Transactions on Pattern Analysis and Machine Intelligence, v.29 n. 3, p. 394-410, Mar. 2007.*

J. Yu and Q. Tian. Semantic subspace projection and its application in image retrieval. IEEE Transactions on Circuits and Systems for Video Technology, 18(4):544-548, Apr. 2008.*

Liu, Y., Qin, T., Liu, T., Zhang, L., Ma, W.: Similarity space projection for Web image search and annotation. In: MIR 2005, pp. 49-56 (2005).*

J-Y Pan, et al., "GCap: Graph-Based Automatic Image Captioning" Proceedings of the 2004 IEEE Computer Society Conference on Computer Vision and Pattern Recognition Workshops, pp. 146-155, Jun. 27, 2004.

J. Urban, et al., "Adaptive Image Retrieval Using a Graph Model for Semantic Feature Integration," Proceedings of the ACM International Multimedia Conference and Exhibition—MIR 2006, pp. 117-126, Oct. 26-27, 2006.

D. R. Hardoon, et al., "A Correlation Approach for Automatic Image Annotation," Lecture Notes in Artificial Intelligence, vol. 4093, pp. 681-692, Jan. 1, 2006.

(Continued)

*Primary Examiner* — Jin-Cheng Wang
(74) *Attorney, Agent, or Firm* — Dickstein Shapiro LLP

(57) ABSTRACT

A first image having annotations is segmented into one or more image regions. Image feature vectors and text feature vectors are extracted from all the image regions to obtain an image feature matrix and a text feature matrix. The image feature matrix and the text feature matrix are projected into a sub-space to obtain the projected image feature matrix and the text feature matrix. The projected image feature matrix and the text feature matrix are stored. First links between the image regions, second links between the first image and the image regions, third links between the first image and the annotations, and fourth links between the annotations are established. Weights of all the links are calculated. A graph showing a triangular relationship between the first image, image regions, and annotations is obtained based on all the links and the weights of the links.

20 Claims, 13 Drawing Sheets

OTHER PUBLICATIONS

T. Bailloeul, et al., "Automatic Image Tagging as a Random Walk with Priors on the Canonical Correlation Subspace," Proceedings of the 1st ACM International Conference on Multimedia Information Retrieval, Vancouver, BC,CA, pp. 75-82, Oct. 30-31, 2008.

* cited by examiner

FIG.12

IMAGE LEARNING, AUTOMATIC ANNOTATION, RETRIEVAL METHOD, AND DEVICE

BACKGROUND OF THE INVENTION

1. Field of the Invention

The present invention relates to image processing technologies and, in particular, to image learning, automatic annotation, a retrieval method, and a device.

2. Description of the Related Art

With rapid development of networks and wide-spread use of mobile phones and home-use digital cameras having digital image sensors, large amounts of digital image resources are generated.

In order to handle large amounts of image data, effective and practical image retrieval systems are demanded. Therefore, in a content-based image retrieval (CBIR) field, a study has been made based on a content to extract a definite word meaning content from an image so as to access and retrieve user images.

The above study is based on retrieval in which the CBIR uses image similarity in an initial stage. In other words, when images, colors, or schematic views are input by the user, retrieval results are also images similar to the input images, the colors, or the schematic views. However, such a CBIR is hardly practical. The following two points are regarded as main reasons.

First, the user is required to have an image or required to have an ability to appropriately select colors or describe schematic views. These requirements pose a barrier to the user, thus limiting widespread use of the above system.

Furthermore, the image retrieval based on image similarity depends on comparison in similarity between bottom layer images. However, there is a difference in word meanings between the features of the bottom layer and the image information of an upper layer. Therefore, as a result of the retrieval, it is likely that the bottom layer images are greatly different in word meanings although they are visually similar. This results in a great impact on accuracy in the retrieval result.

In order to solve the above problems in the CBIR, researchers have proposed a retrieval system based on image annotation. In this retrieval system, annotations are made in text information for image data so as to perform image retrieval based on texts. Since this method allows the user to perform retrieval only with the input of a keyword, the above requirements on the user's ability are reduced.

As present image automatic annotation, the following methods are known.

Method 1:

Automatic annotation is made based on original data (such as time, GPS information, an image name associated with an image taken by a digital camera, a text associated with an image in a digital format, etc.).

Method 2:

After estimation of a complicated association between a character and an image using computer visual technology and machine learning technology in a learning stage, automatic annotation is made on images not appearing in the learning stage based on the association.

However, the above method 1 based on original data has the following problems.

In other words, the original data of an image may not be associated with an image content. Therefore, the quality of image annotation is poor.

Since the above method is applied only to an image with a text, its application range is greatly limited.

The method 1 has an unavoidable defect. Therefore, the method 2 has been proposed as a modification of the method 1. The details of the method 2 are as follows.

The method 2 includes the following steps.

Step A:

An image is segmented into regions with a region segmentation method, and the feature vectors of the respective regions are calculated.

Step B:

In the learning stage, the respective regions and k regions nearest the respective regions are linked to each other, and the image and real annotations related to the image are linked to each other.

Step C:

In an automatic annotation stage, all the graphs built with a random walk with restart (RWR) are searched for to obtain corresponding annotations.

The above method is specifically referred to as "GCap: Graph-based automatic image captions" in Proc. Of the 4$^{th}$ International Workshop on Multimedia Data and Document Engineering (MDDE), in conjunction with Computer Vision Pattern Recognition Conference (CVPR' 04), 2004 by J. Y.Pan, H. J.Yany, C. Faloutsos, and P. Duygulu.

The GCap algorithm is theoretically based on the fact that an access time to the node of an annotated image (measured image) is greater than an access time to another node. Thus, by confirming the access time to the annotated node, it is possible to find the annotation having the strongest correlation.

However, there is a likelihood of causing image regions that are erroneously linked to each other in the graph obtained in the learning stage by the above method, which results in poor accuracy in annotation.

SUMMARY OF THE INVENTION

The present invention may have an object of providing image learning, automatic annotation, a retrieval method, and a device and improving accuracy in automatic annotation on images and retrieval.

According to one aspect of the present invention, there is provided an image learning method including performing a segmentation operation on a first image having annotations to segment the first image into one or more image regions; extracting image feature vectors and text feature vectors from all the image regions to obtain an image feature matrix and a text feature matrix; projecting the image feature matrix and the text feature matrix into a sub-space so as to maximize covariance between an image feature and a text feature, thereby obtaining the projected image feature matrix and the text feature matrix; storing the projected image feature matrix and the text feature matrix; establishing first links between the image regions based on the projected image feature matrix; establishing second links between the first image and the image regions based on a result of the segmentation operation; establishing third links between the first image and the annotations based on the first image having the annotations; establishing fourth links between the annotations based on the projected text feature matrix; calculating weights of all the links; and obtaining a graph showing a triangular relationship between the first image, the image regions, and the annotations based on all the links and the weights of the links corresponding to the links.

According to another aspect of the present invention, there is provided an image learning device including an image segmentation module that performs a segmentation operation on a first image having annotations to segment the first image into one or more image regions; a feature vector extraction module that extracts image feature vectors and text feature vectors from all the image regions to obtain an image feature matrix and a text feature matrix; a sub-space projection module that projects the image feature matrix and the text feature matrix into a sub-space so as to maximize covariance between an image feature and a text feature, thereby obtaining the projected image feature matrix and the text feature matrix; a storage module that stores the projected image feature matrix and the text feature matrix; and a graph building module that establishes first links between the image regions based on the projected image feature matrix; establishes second links between the first image and the image regions based on a result of the segmentation operation; establishes third links between the first image and the annotations based on the first image having the annotations; establishes fourth links between the annotations based on the projected text feature matrix; calculates weights of all the links; and obtains a graph showing a triangular relationship between the first image, the image regions, and the annotations based on all the links and the weights of the links corresponding to the links.

According to still another aspect of the present invention, there is provided an image retrieval method based on an input second image, the image retrieval method including a learning step, a preliminary processing step, a graph update step, and a retrieval step. The learning step includes performing a segmentation operation on a first image having annotations to segment the first image into one or more image regions; extracting image feature vectors and text feature vectors from all the image regions to obtain an image feature matrix and a text feature matrix; projecting the image feature matrix and the text feature matrix into a sub-space so as to maximize covariance between an image feature and a text feature, thereby obtaining the projected image feature matrix and the text feature matrix; storing the projected image feature matrix and the text feature matrix; establishing first links between the image regions based on the projected image feature matrix; establishing second links between the first image and the image regions based on a result of the segmentation operation; establishing third links between the first image and the annotations based on the first image having the annotations; establishing fourth links between the annotations based on the projected text feature matrix; calculating weights of all the links; and obtaining a graph showing a triangular relationship between the first image, the image regions, and the annotations based on all the links and the weights of the links corresponding to the links. The preliminary processing step includes receiving the second image; performing the segmentation operation on the second image to segment the second image into one or more image regions; extracting image feature vectors from all the image regions to obtain an image feature matrix of the second image; and projecting the image feature matrix into the sub-space to obtain a projected image feature matrix of the second image. The graph update step includes establishing fifth links between the image region nodes of the second image and the image region nodes in the graph based on the projected first image feature matrix and the second image feature matrix; establishing sixth links between the second image and the image region nodes based on a result of the segmentation operation; determining weights of the links of the fifth links and the sixth links; and updating the graph based on the fifth links and the sixth links and the weights of the links corresponding to the fifth links and the sixth links. The retrieval step includes generating a restart vector corresponding to the second image; and acquiring and outputting a predetermined number of annotations most closely related to the second image with a random walk with restart.

Other objects, features and advantages of the present invention will become more apparent from the following detailed description when read in conjunction with the accompanying drawings.

BRIEF DESCRIPTION OF THE DRAWINGS

FIG. 12 is a graph matrix updated in the embodiment of the present invention;

DETAILED DESCRIPTION OF THE PREFERRED EMBODIMENTS

In image learning, automatic annotation, a retrieval method, and a device according to an embodiment of the present invention, image feature vectors are projected into a canonical covariance sub-space in a learning stage to maximize covariance between an image and annotations, thereby making it possible to build a graph more robustly, reduce image regions that are erroneously linked to each other, and finally make excellent image annotations.

Figure 1:
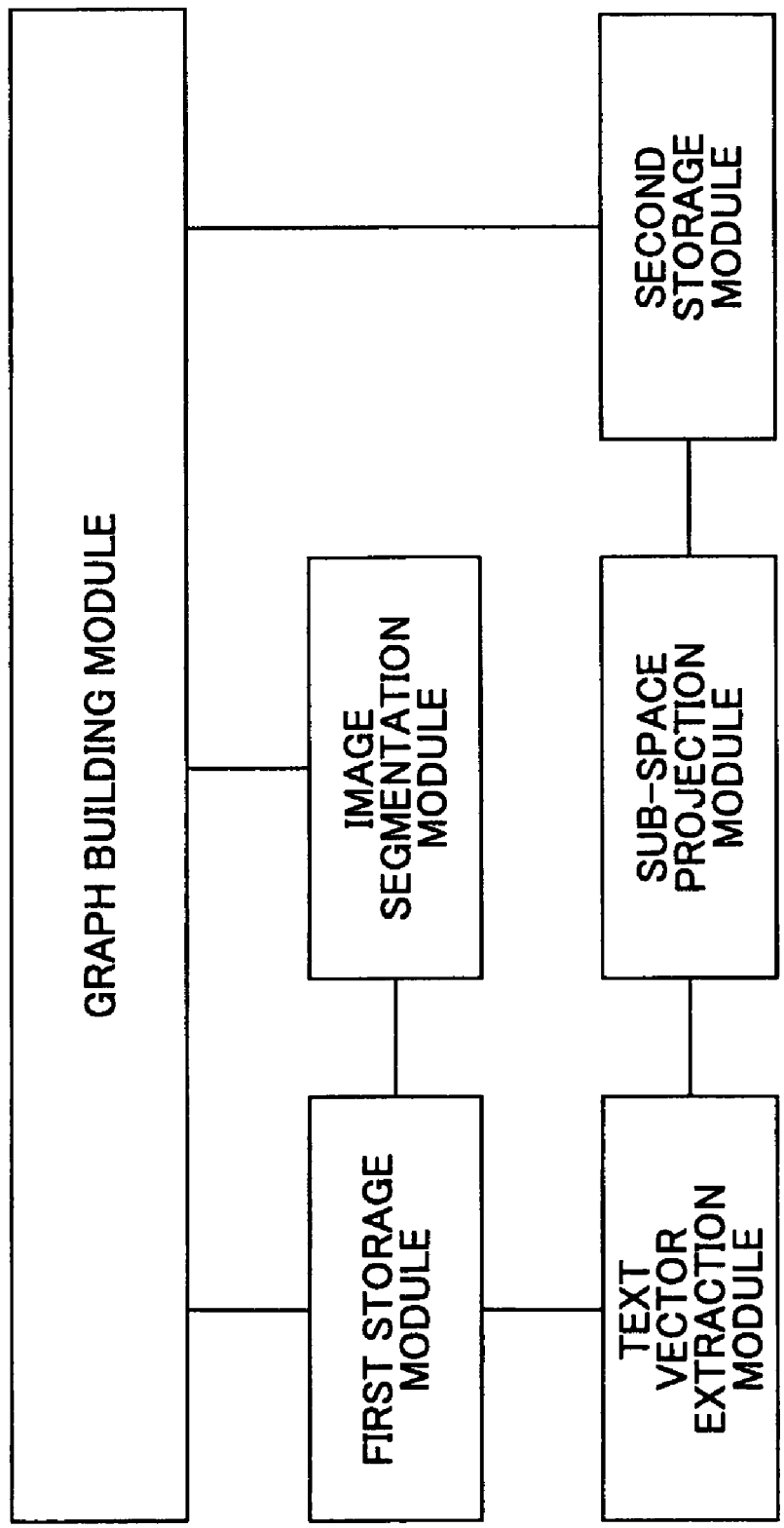
FIG. 1 is a diagram showing the configuration of an image learning device according to an embodiment of the present invention.

As shown in FIG. 1, an image learning device according to the embodiment of the present invention includes a first storage module, an image segmentation module, a feature vector extraction module, a sub-space projection module, a second storage module, and a graph building module. The first storage module stores an image having annotations and a group of annotation keywords, wherein the image has one or more annotations obtained from the group of keywords and describing the word meaning content of the image. The image segmentation module performs a segmentation operation on the image stored in the first module to segment it into one or more image regions. The feature vector extraction module extracts the image feature vectors of the image regions from image features and the text feature vectors of the image regions from text features, thereby extracting the feature vectors that eliminate information and noise unnecessary for the image and grasp an essential content. The sub-space projection module projects the image feature vectors of the image regions into the sub-space to obtain image feature projection vectors and the text feature vectors of the image regions into the sub-space to obtain text feature projection vectors, thereby maximizing the covariance between the image features and the text features. The second storage module separately stores the image feature projection vectors and the text feature projection vectors of the image regions. The graph building module establishes a link between the image regions based on the image feature projection vectors, establishes links between the image and the image regions based on the operation of the image segmentation module, establishes links between the image and the annotations of the image based on the image having the annotations, establishes links between the annotations based on the text feature projection vectors, calculates all the weights of these links, and obtains a graph showing a triangular relationship between the first image, the image regions, and the annotations based on the links and the weights of the links.

Furthermore, an image learning method according to the embodiment of the present invention includes a first storage step, an image segmentation step, a feature vector extraction step, a sub-space projection step, a second storage step, and a graph building step. The first storage step includes storing an image having annotations and a group of annotation keywords, wherein the image has one or more annotations obtained from the group of annotation keywords and describing the word meaning content of the image. The image segmentation step includes performing a segmentation operation on the stored image to segment it into one or more image regions. The feature vector extraction step includes extracting the image feature vectors of the image regions from image features and the text feature vectors of the image regions from text features, thereby extracting the feature vectors that eliminate information and noise unnecessary for the image and grasp an essential content. The sub-space projection step includes projecting the image feature vectors of the image regions into a sub-space to obtain image feature projection vectors and the text feature vectors of the image regions into the sub-space to obtain text feature projection vectors, thereby maximizing the covariance between the image features and the text features. The second storage includes separately storing the image feature projection vectors and the text feature projection vectors of the image regions. The graph building step includes establishing links between the image regions based on the image feature projection vectors, establishing links between the image and the image regions based on the operation in the image segmentation step, establishing links between the image and the annotations of the image based on the image having the annotations, establishing links between the annotations based on the text feature projection vectors, calculating all the weights of these links, and obtaining a graph showing a triangular relationship between the first image, the image regions, and the annotations based on the links and the weights of the links.

The graph obtained by the graph building module is used as a region for automatically making annotations on an image, a region for performing image retrieval, etc., which is described in detail below.

Next, a description is specifically made of the implementations of the respective modules of the image learning device and the image learning method.

The image segmentation module performs the segmentation operation on an image stored in the first storage module to segment it into one or more image regions. Specifically, according to the embodiment of the present invention, the image can be segmented into one or two or plural image regions. In the following description, two or more image regions are used.

Specifically, in the embodiment of the present invention, the segmentation of an image is performed by the following methods.

Figure 2:
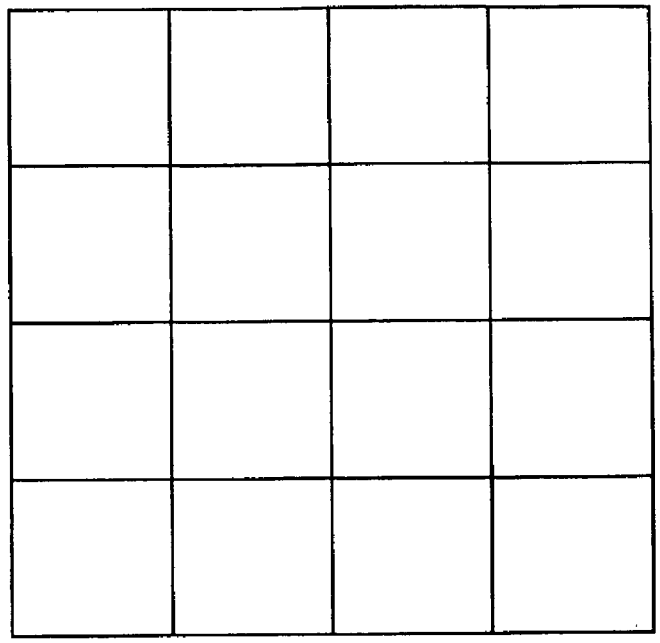
FIG. 2 is a diagram showing a state in which an original image is segmented into plural rectangular blocks in the embodiment of the present invention.

Method 1:
As shown in FIG. 2, an original image (the image that is stored in the first storage module and has annotations) is segmented into plural rectangular blocks.

Figure 3:
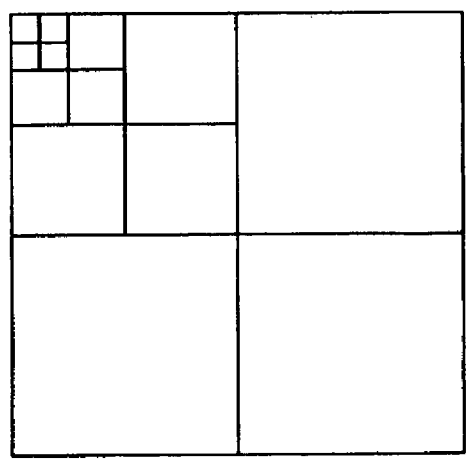
FIG. 3 is a diagram showing a state in which an original image is segmented into multi-resolution quad-tree sub-blocks in the embodiment of the present invention.

Method 2:
As shown in FIG. 3, an original image is segmented into multi-resolution quad-tree sub-blocks.

Figure 4:
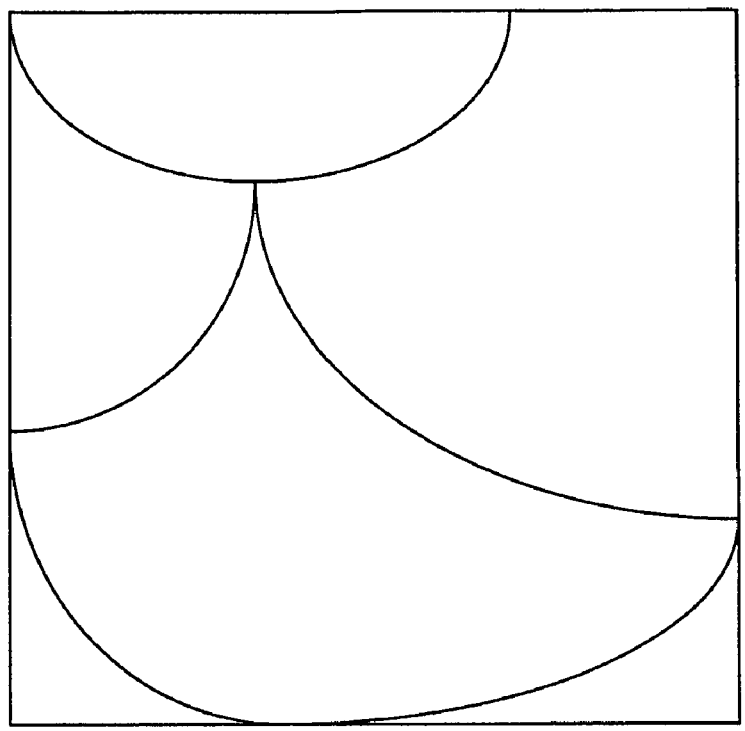
FIG. 4 is a diagram showing a state in which an original image is segmented into plural homogeneous regions in the embodiment of the present invention.

Method 3:
As shown in FIG. 4, an original image is segmented into plural non-overlapping homogeneous regions with an image segmentation algorithm.

In the embodiment of the present invention, the image segmentation method is not limited to the above methods, but other conventional image segmentation techniques may also be employed.

After the segmentation of an image, image features corresponding to the image regions are provided for the image. The feature vector extraction module extracts image feature vectors and the text feature vectors of the whole original image.

All the conventional algorithms are also applied to the extraction of the image feature vectors of the image regions. In the embodiment of the present invention, a LBP (Local Binary Pattern) feature consisting of mixed colors and pattern information is employed in consideration of the ability and the speed for extracting important image features. Note that the LBP is a feature based on a pattern, which is excellent in calculation and contrast with mixed colors.

After the extraction of the image feature vectors of all the image regions (here, the length of the image feature vectors is assumed to be p for the sake of convenience), the image feature vectors of the image regions are regarded as a vector string. Thus, an image feature matrix X is obtained.

The extraction of the text feature vectors includes the following steps.

Step A1:
An annotation that is stored in the first storage module and belongs to a group of keywords associated with the content of an image is collected. All the keywords are obtained from a predetermined group whose size is q.

There are two types of annotation patterns as follows.
Small Annotation:
In this case, the keyword of an image is associated with the whole image. The image can be segmented into plural blocks, but a group of the keywords corresponds to the whole image.
Local Annotation:
A corresponding keyword is provided for each of the image regions of an image.

In the case of the small annotation, all the image regions accept an annotation on the whole image.

Step A2:

After the collection of the annotations, the text feature vectors (length: q) are extracted from the image regions, and the extracted text feature vectors of the image regions are regarded as a vector string. Thus, a text feature matrix Y is obtained.

Figure 5:
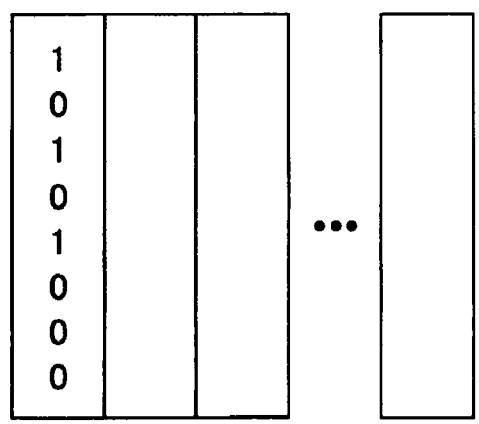
FIG. 5 is a diagram showing an example of a text feature matrix Y in the embodiment of the present invention.
Figure 6:
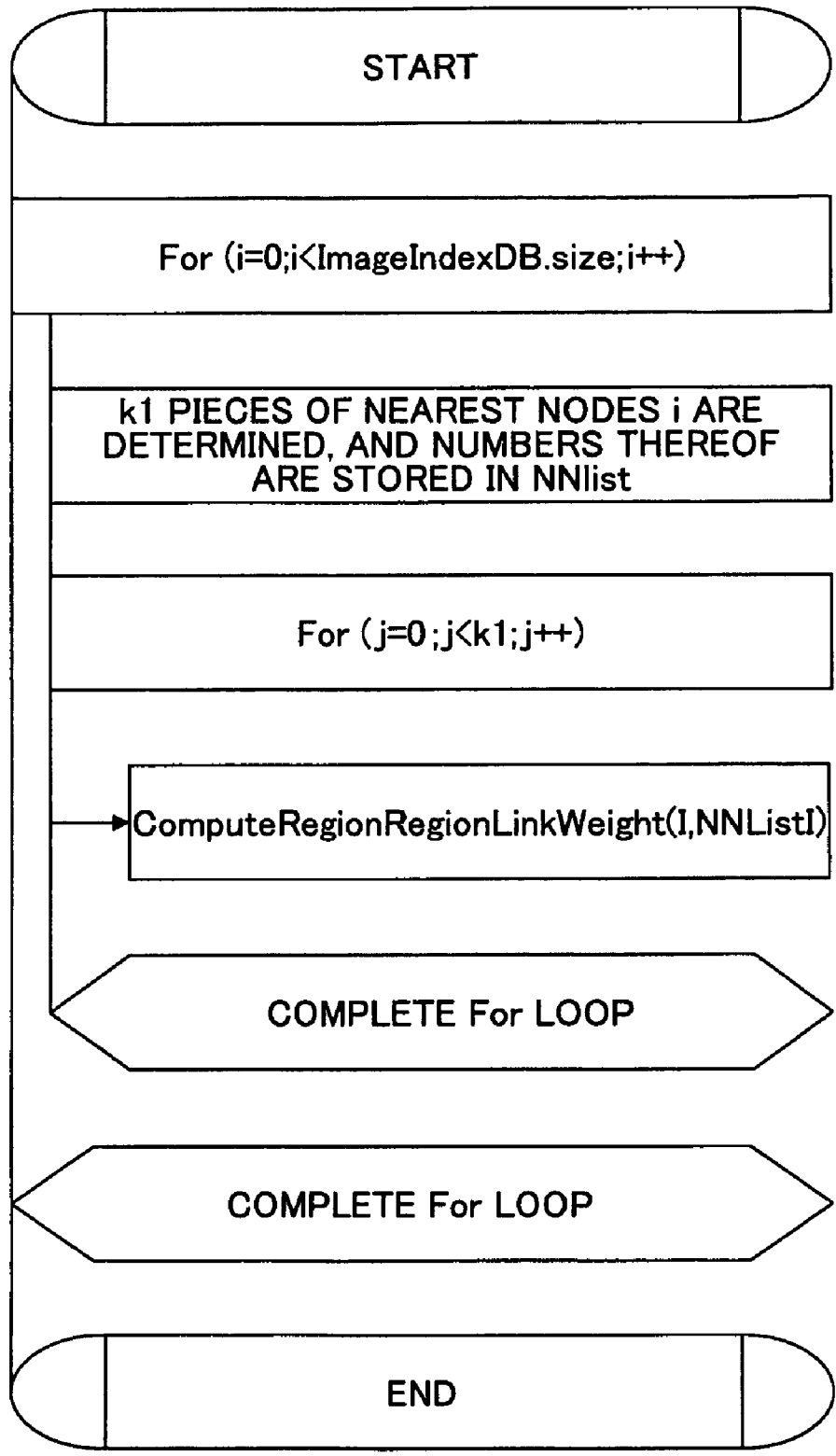
FIGS. 6 through 9 are flowcharts showing the implementation of an algorithm for establishing links and determining the weights of the links in the embodiment of the present invention.
Figure 7:
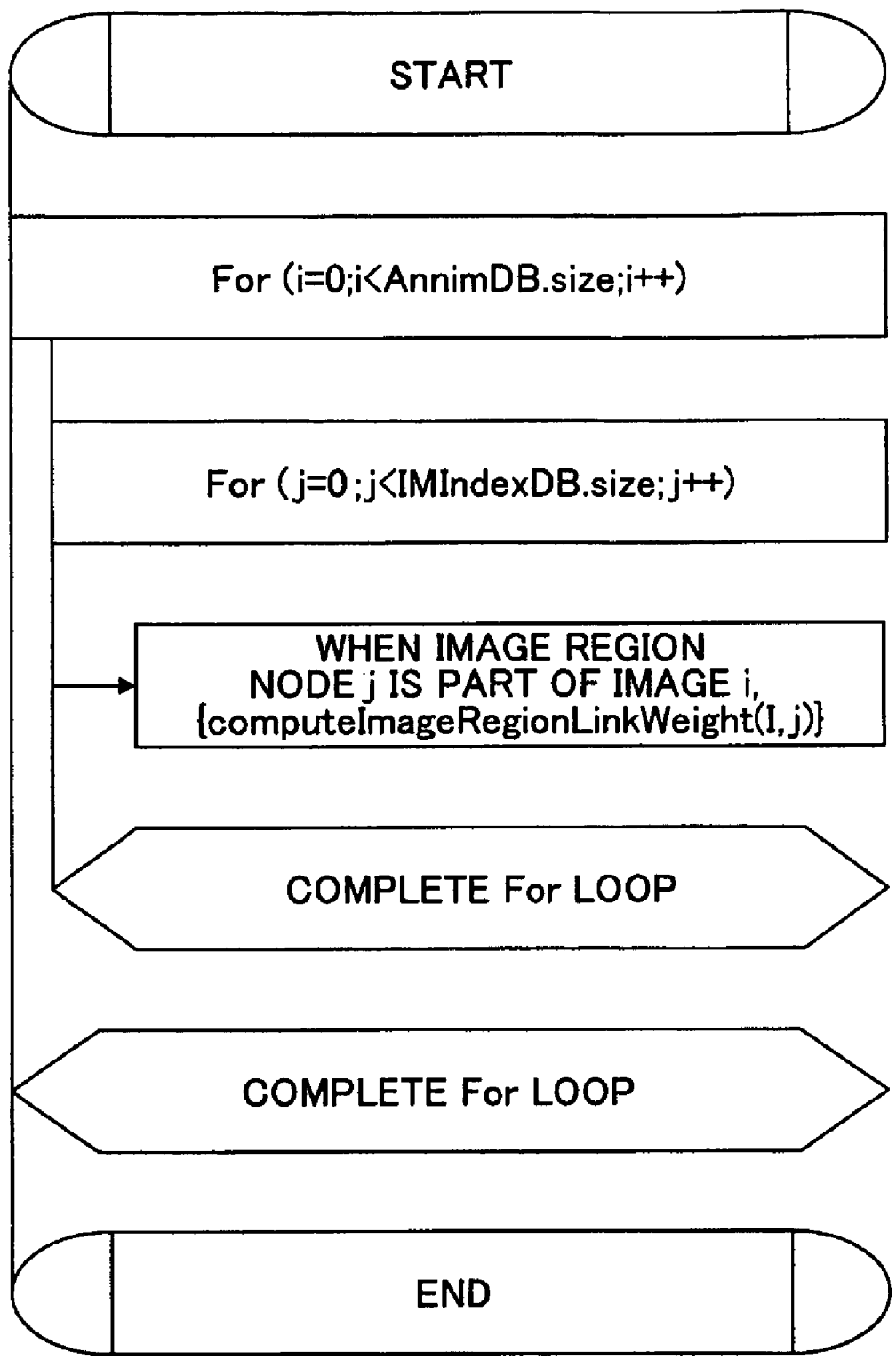
Figure 8:
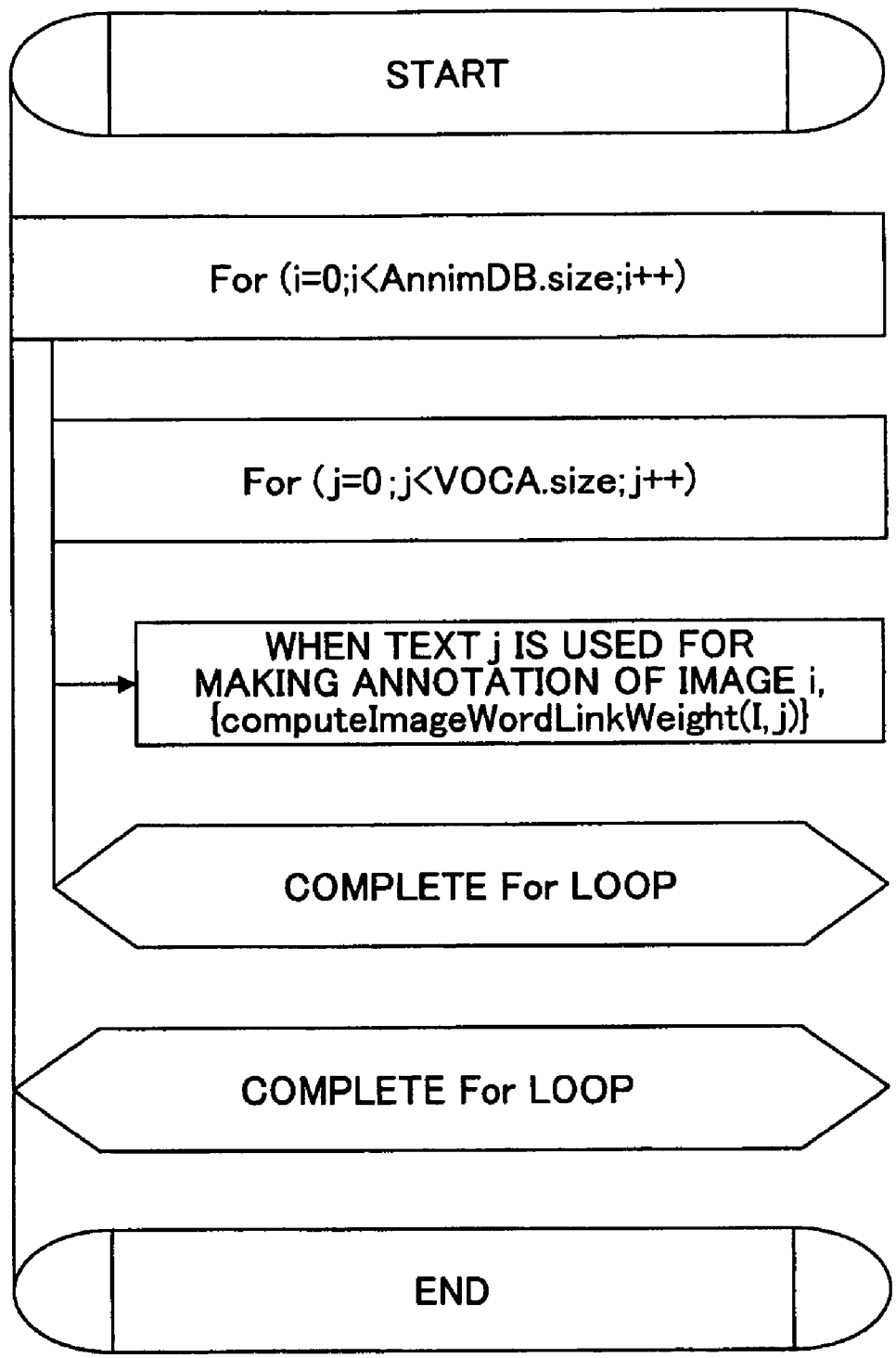
Figure 9:
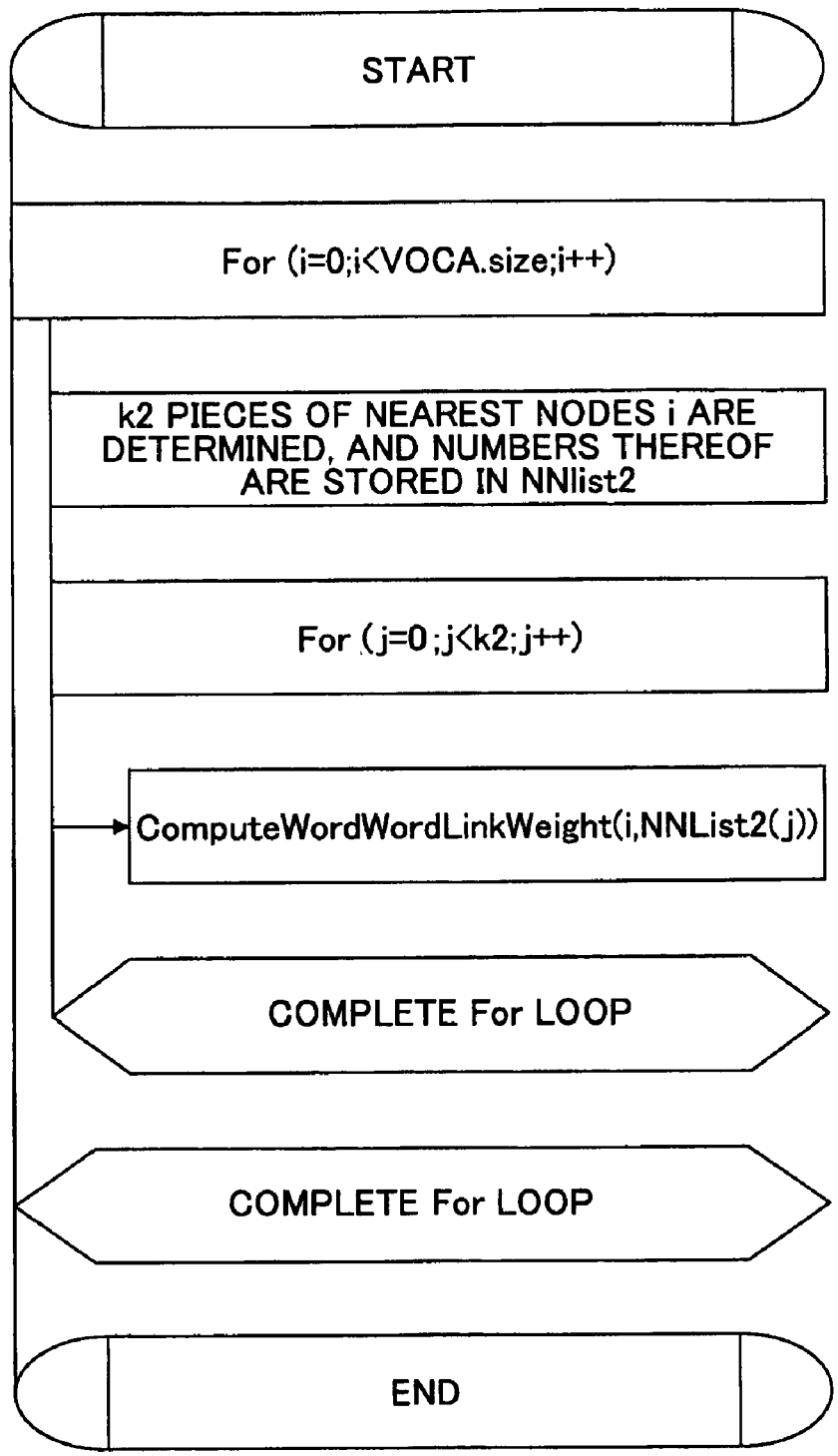

FIG. 5 shows an example of the text feature matrix Y. In FIG. 5, the text feature vectors of the image regions are q-dimensional. Elements corresponding to an image keyword represent "1," while the remaining elements represent "0." In this embodiment, the first, the third, and the fifth keywords in a word table whose group size is q (q=8) constitute a first region.

After the image feature matrix X and the text feature matrix Y are obtained, the sub-space is projected. However, prior to the detailed description of the sub-space projection, the effects of operating the sub-space projection are described.

The sub-space projection has two objects.

One object is to reduce the dimensions of the image feature matrix and the text feature matrix. Thus, subsequent graph building speed, annotation speed, and retrieval speed can be accelerated.

The other object is to enhance consistency between image data and text data. Thus, a graph can be built more robustly in the subsequent processing, which in turn provides higher image annotation accuracy and image retrieval accuracy.

In the embodiment of the present invention, the operations of the sub-space projection module include the following steps.

Step B1:

The image feature matrix and the text feature matrix, i.e., a group of the image feature vectors of the image regions and a group of the text feature vectors of the image regions are acquired.

Step B2:

The covariance between the image features and the text features is maximized to obtain the image feature projection matrix and the text feature projection matrix.

Step B3:

The projected image feature matrix is acquired and stored by the image feature projection matrix and the image feature matrix. The projected text feature matrix is acquired and stored by the text feature projection matrix and the text feature matrix.

In the embodiment of the present invention, the image features are projected into the canonical covariance sub-space so as to maximize the covariance between the image and the annotations, and CCovA (canonical covariance analysis) is employed. The reason is as follows.

In other words, the image regions having similar images can be more closely related to each other in the CCOvA space, thus reducing an error in a link closest to the regions.

Furthermore, the lengths of the image feature vectors are reduced, thereby shortening a calculation time.

Here, the covariance between the image features and the text features is expressed by the following formula.

$$\rho_{PLS} = W_x{}^t C_{xy} W_y / \sqrt{W_x{}^t W_x W_y{}^t W_y}$$

Here, $C_{xy}$ represents a correlation matrix between an image and a text, which can be defined as follows.

$$\hat{C}_{xy} = \tilde{X}\tilde{Y}^t/(N-1) = \hat{C}_{yx}{}^t \in R^{p \times q}$$

Here, $\tilde{X}$ and $\tilde{Y}$ are the centered and unit variance stacks of image and text feature matrices, respectively, which can be expressed by the following formulae.

$$\tilde{X} = \left(\frac{x_1 - \hat{m}_x}{\hat{\sigma}_x}, \ldots, \frac{x_N - \hat{m}_x}{\hat{\sigma}_x}\right)$$

$$\tilde{Y} = \left(\frac{y_1 - \hat{m}_y}{\hat{\sigma}_y}, \ldots, \frac{y_N - \hat{m}_y}{\hat{\sigma}_y}\right)$$

Here, the following relationships are established.

$$\hat{m}_x = \frac{1}{N}\sum_{i=1}^{N} x_i \in R^p$$

$$\hat{\sigma}_x^2 = \frac{1}{N-1}\sum_{i=1}^{N}(x_i - \hat{m}_x)^2 \in R^p$$

$$\hat{m}_y = \frac{1}{N}\sum_{i=1}^{N} y_i \in R^q$$

$$\hat{\sigma}_y^2 = \frac{1}{N-1}\sum_{i=1}^{N}(y_i - \hat{m}_y)^2 \in R^q$$

Here, N represents the number of image regions, and $x_i$ and $y_i$ represent the i-th columns in matrices X and Y, respectively.

SVD (Singular Value Decomposition) is applied to a correlation matrix Cxy so as to maximize the covariance. The SVD is assumed to be applied to Cxy as follows.

$$C_{xy} = UDV^t$$

Here, D represents the diagonal matrix of $m_0 \times m_0$ and includes $m_0$ pieces most significant remarkable image-text covariance values diagonally arranged in descending order.

Accordingly, an image feature projection matrix $W_x$ and a text feature projection matrix $W_y$ are represented as follows.

$$W_x = U$$

$$W_y = V$$

After the image feature projection matrix $W_x$ and the text feature projection matrix $W_y$ are obtained, the groups of the image feature vectors and the text feature vectors (i.e., the stacked matrices X and Y) are projected into the corresponding sub-space. The projected image feature matrix $X_{proj}$ and the text feature matrix $Y_{proj}$ can be expressed by the following formulae.

$$X_{proj} = W_x{}^t \times X$$

$$Y_{proj} = W_y{}^t \times Y$$

$X_{proj}$ and $Y_{proj}$ represent an $m_0 \times N$ matrix, and the relationships $m_0 \leq p$ and $m_0 \leq q_0$ are established.

The projected image feature matrix $X_{proj}$ is optimized to perform nearest neighbor search in image region, while the projected text feature matrix $Y_{proj}$ is optimized to perform nearest neighbor search in text sub-space.

After the projected image feature matrix $X_{proj}$ and the text feature matrix $Y_{proj}$ are obtained, the graph is built based on these matrices. Next, the structure of the graph is described in detail below.

In the embodiment of the present invention, the building of the graph includes the steps of establishing first links between the image regions based on the projected image feature projection vectors; establishing second links between the image and the image regions of the image based on the operation of the image segmentation module; establishing third links between the image and the annotations of the image based on the image having the annotations; establishing fourth links between the annotations based on the text feature projection vectors; calculating the weights of all the links; and obtaining the graph showing the triangular relationship between the first image, the image regions, and the annotations based on the links and the weights of the links.

Since the first, the second, the third, and the fourth links each includes plural links, a single link of the first, the second, the third, and the fourth links is referred to as a sub-link for the sake of convenience.

The display image, the image regions, and the annotations are described by nodes as described below. Relationships between the nodes are indicated by link lines between the nodes, and a finally-obtained graph is represented by an adjacency matrix A. The link between the nodes i and j in the graph is expressed by the relationship $a_{ij}=w\neq 0$. Here, w represents the weight of the link. If there is no link between the nodes i and j, the relationship $a_{ij}=0$ is established. Since there is no directionality in the link, the matrix A is a square matrix in which any diagonal term represents 0 (the node and the link of the node itself are not considered).

The graph built in the above manner has the following three types of nodes.

1. All the original images in the first storage module (image nodes)

2. All the image regions after being segmented (image region nodes)

3. Annotations keywords (annotation nodes)

Dependencies exist between the image node and the image region nodes and between the image node and the annotation nodes.

Next, the respective parts are described in detail below.

(Establishing Links Between Image Region Nodes)

In the image region nodes, the nearest image region node is searched for based on the projected image feature matrix $X_{proj}$ for each image region node (referred to be the first image region node for the sake of convenience) so that the link between the first image region node and K1 pieces of the image region nodes nearest the first image region node is established.

In the embodiment of the present invention, the weights of the links between the image regions can be confirmed by the following two methods.

Weight Confirmation Method 1:

The same weight is applied to all the sub-links. In other words, the same weight value is provided for the respective links.

Weight Confirmation Method 2:

Different weight values are applied to all the sub-links based on a difference in the images of the sub-links corresponding to the image region nodes. Specifically, the larger the difference in the images between the sub-links corresponding to the image region nodes is, the smaller the weight values become.

When the weight confirmation method 2 is employed, the image region node that is relatively greatly different in the image from a current image region node has only a small influence on the current image region node because the weight value of the sub-link is small. Therefore, an accurate annotation and/or retrieval result can be ensured even after plural accesses with the subsequent RWR algorithm.

Next, the implementation of the weight confirmation method 2 is described based on an example.

Link ($r_i \rightarrow r_j$) represents the weight of the sub-link between the image regions. Here, the value of i is different from that of j.

Link ($r_i \rightarrow r_j$) is determined by image visual similarity between the image region nodes and defined as the decreasing function of a feature distance between the image region nodes i and j in the projected image sub-space.

For example, when a norm L2 between features is used as a distance $d_{im}$, the decreasing function is defined as follows.

$$\text{link}(r_i, r_j) = A\exp\left(-\frac{d_{im}}{\bar{d}_{im}}\right)^2$$

Here, $\bar{d}_{im}$ represents an average distance between an image region node $r_i$ and K1 pieces of the nearest image region nodes. A represents an amplitude parameter.

When a visual difference in the image regions between the nodes is large, the distance $\bar{d}_{im}$ increases and the weight value decreases, thereby making it possible to prevent the image region nodes from being erroneously linked to each other in the graph and improve the quality of making annotation and retrieval.

In the above description, the norm L2 is used. However, other methods such as chi-square or entropy measures may also be used.

(Links Between Image Node and Image Region Nodes)

The link between the image node and all the image region nodes of the image is established for each of the image nodes. When the image is not segmented, only one image region node exists. In this case, the image node corresponds to the image region node.

Here, the link is established by the operation of the image segmentation module.

The weight (Link ($lmi \rightarrow rj$)) of the sub-link between the image node and the image region node is determined by the parent-child relation between the image node and the image region node. If the image region node rj is the sub-image region node of an image node lmi, (Link ($lmi \rightarrow rj$)) becomes a constant other than 0. If not, (Link ($lmi \rightarrow rj$)) becomes 0.

(Links Between Image Node and Annotations of Image Node)

The link between image node and all the annotations of the image node is established for each of the image nodes.

Here, the link is established based on the image information of the first storage module. In the embodiment of the present invention, the weight of the link between the image node and the annotations of the image node can be determined by the following two methods.

Weight Determination Method 1:

The larger the number of appearances of the annotation node corresponding to the sub-link in the annotations of the image stored in the first storage module is, the larger the weight value of the sub-link become.

Weight Determination Method 2:

The larger the number of appearances of the annotation node corresponding to the sub-link in the annotations of the image stored in the first storage module is, the smaller the weight value of the sub-link becomes.

In the case of the weight determination method 1, it is natural that the RWR algorithm searches for an annotation word appearing at a higher frequency in word collections. Therefore, the word appearing at the higher frequency is always possible to be output as the annotation result of a retrieval image. However, this method may be inaccurate in some cases. Accordingly, biasing to the frequently-appearing word can be prevented with the weight determination method 2.

A specific weight determination method is as follows.

$$\text{link}(Im_i, w_j) = (B - \beta) + \beta \left( \frac{\text{max\_occur} - w_j\_\text{occur}}{\text{max\_occur} - \text{min\_occur}} \right)$$

Here, B represents an amplitude parameter, and β is a parameter that tunes the weight balance between popular and seldom used words. Furthermore, max_occur represents the number of times the most popular word occurred, and min_occur is the number of times the most seldom word occurred. Furthermore, $w_j\_\text{occur}$ is the number of times the considered word word $w_j$ occurred.

(Links Between Annotation Nodes)

The link between the annotation node and K2 pieces of standard nodes nearest the annotation node is established for each of the annotation nodes. Here, the nearest standard nodes are searched for by the projected text feature matrix $Y_{proj}$.

link ($w_i \rightarrow w_j$) represents the weight of the sub-link between the annotation nodes.

The weight of the link between $w_i$ and $w_j$ is determined by textual similarity between the keywords of $w_i$ and $w_j$, and it is defined as the decreasing function of the distance between the projected text features i and j in the text sub-space. For example, when the norm L2 between the features is used as a distance $d_{txt}$, the decreasing function is defined as follows.

$$\text{link}(w_i, w_j) = C \exp\left( -\frac{d_{txt}}{\overline{d}_{txt}} \right)^2$$

Here, $\overline{d}_{txt}$ represents an average distance between an image region node $r_i$ and K1 pieces of image region nodes nearest the image region node $r_i$. Furthermore, C represents an amplitude parameter.

If there is a relatively large difference in meaning between words, the weight value of the sub-link is decreased as the distance $d_{txt}$ increases. Thus, the link between the words having the same meanings is enhanced, thereby making it possible to make annotations more excellent in correlation and consistency in image annotation.

As shown in FIGS. 6 through 9, the above links are established, and the algorithm for determining the weights of the links is performed. Here, ImageIndexDB.size and IMIndexDB.size represent the number of image region nodes, AnnimDB.size represents the number of images stored in the first storage module, and VOCA.size represents the number of keywords in a group of annotation keywords.

Figure 10:
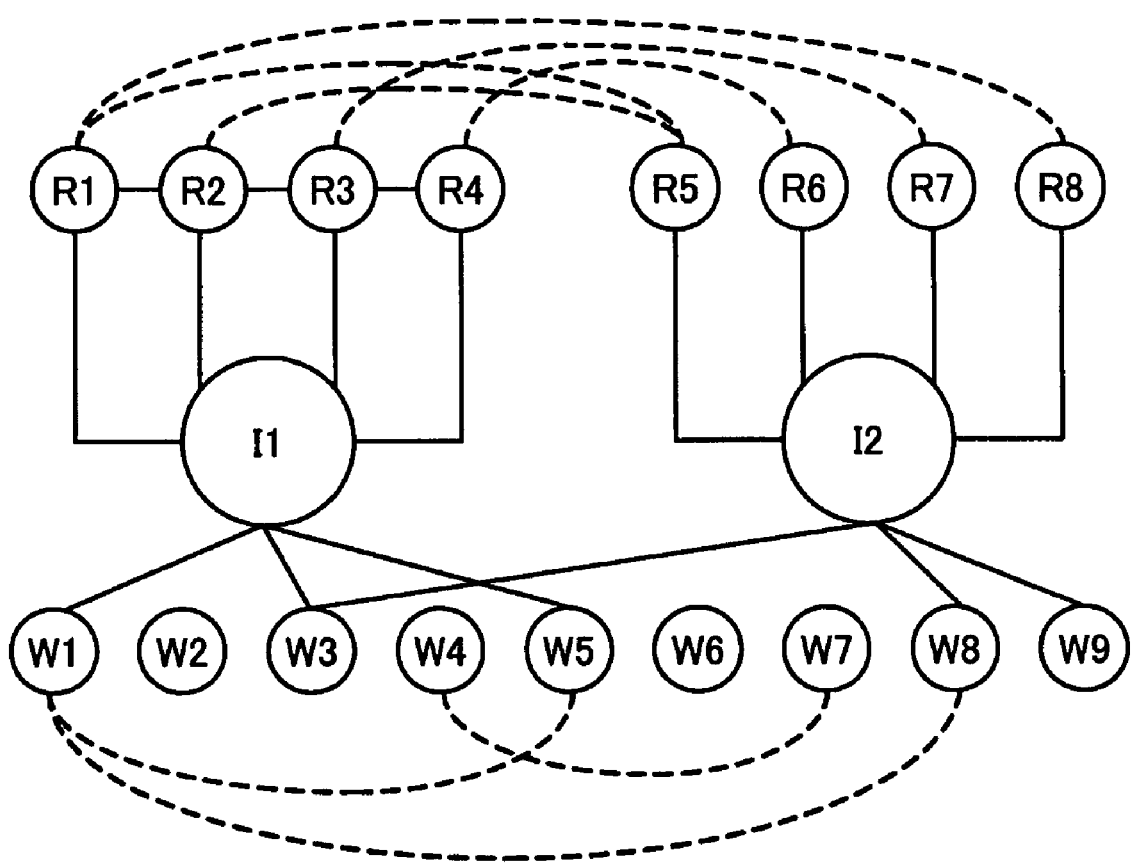
FIG. 10 is a graph obtained by the image learning according to the embodiment of the present invention.

FIG. 10 shows the graph built by the above method.

In FIG. 10, only two image nodes are shown. A first image node I1 has four image region nodes R1 through R4, and a second image node I2 has four image region nodes R5 through R8. In addition, nine annotation nodes exist, which are represented as W1 through W9. FIG. 10 shows the links between the image region nodes, the links between the image nodes and the image region nodes, the links between the image nodes and the annotation nodes, and the links between the annotation nodes.

Figure 11:
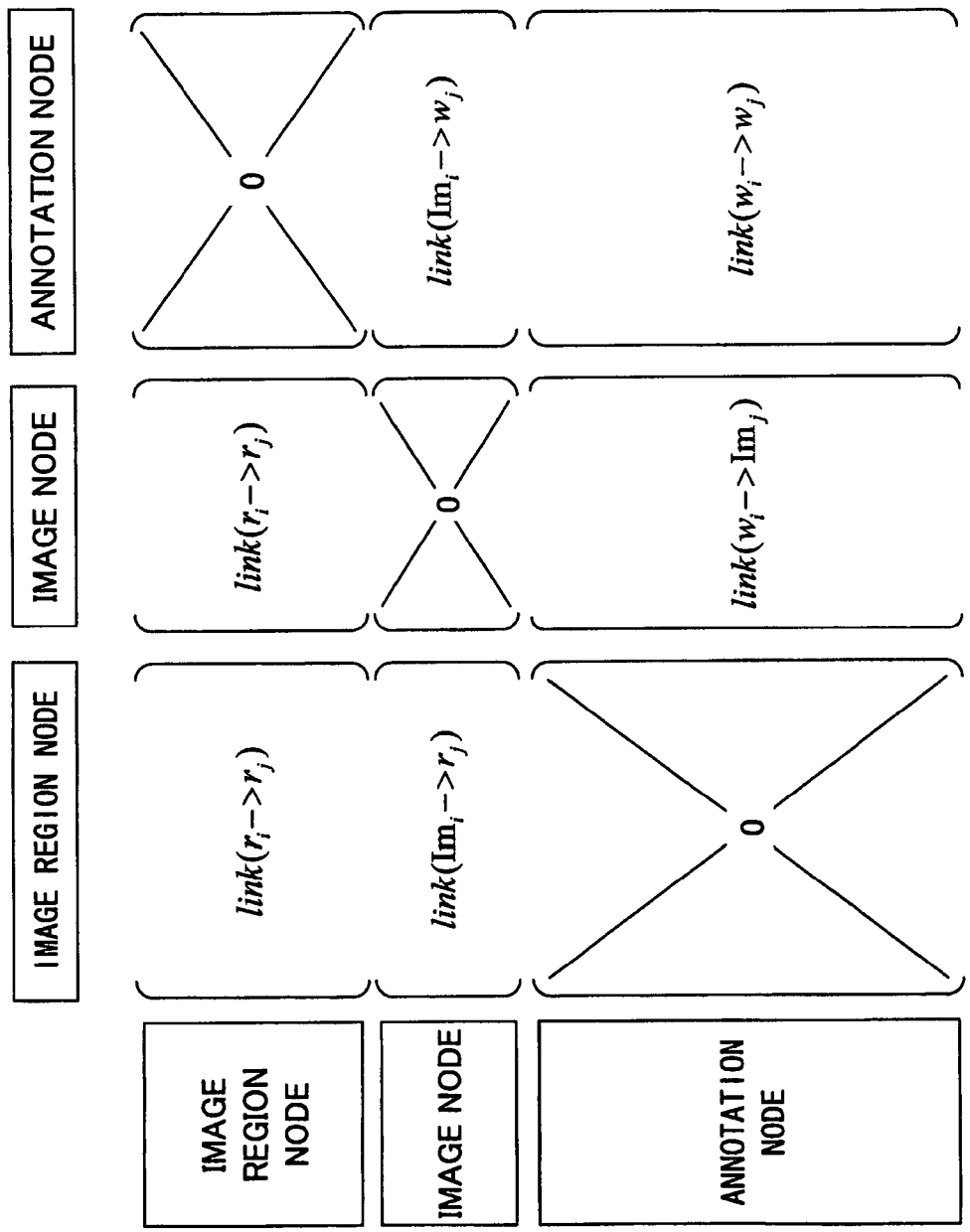
FIG. 11 is a graph matrix obtained by the image learning device according to the embodiment of the present invention.
Figure 13:
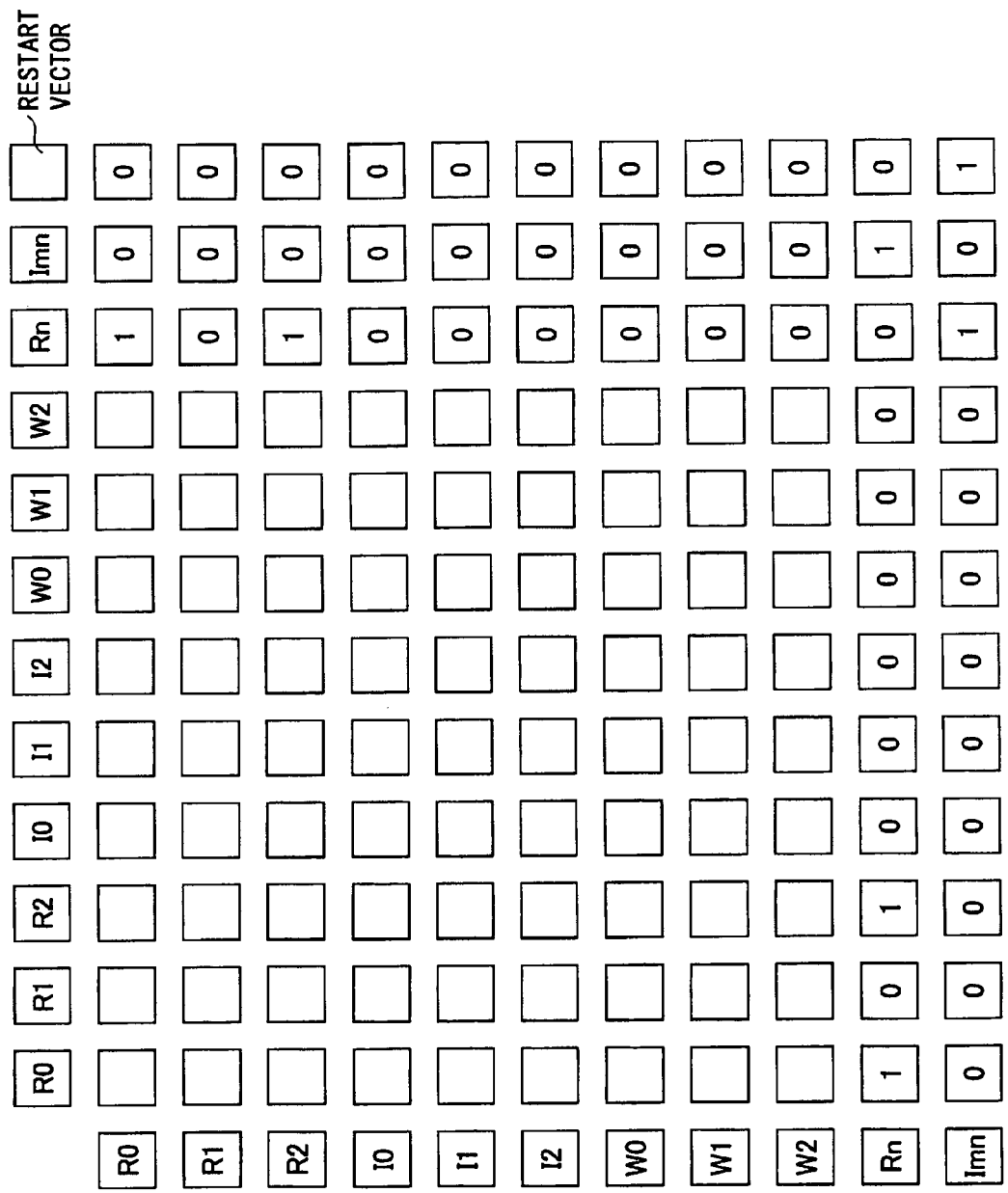
FIG. 13 is a diagram showing a restart vector according to the embodiment of the present invention.

FIG. 11 shows the adjacency matrix A of the finally-obtained graph.

In the embodiment of the present invention, after the adjacency matrix A is obtained, annotation and retrieval are made using the adjacency matrix A, which is described below.

An image automatic annotation device according to the embodiment of the present invention is composed of the following modules. In other words, the image automatic annotation device includes a first storage module, a reception module, an image segmentation module, a feature vector extraction module, a sub-space projection module, a second storage module, a graph building module, an image update module, an annotation node acquisition module, and an annotation module. The first storage module stores a first image having annotations and a group of annotation keywords, wherein the first image has one or more annotations obtained from the group of keywords and describing the word meaning content of the first image. The reception module receives a second image stand by for retrieval. The image segmentation module performs a segmentation operation on the first and second images to segment them into one or more image regions. The feature vector extraction module extracts the image feature vectors of the image regions in the first image from image features, the text feature vectors of the image regions in the first image from text features, and the image feature vectors of the image regions in the second image from the image features, thereby extracting the feature vectors that eliminate information and noise unnecessary for the images and grasp an essential content. The sub-space projection module projects the image feature vectors of the image regions in the first image into a sub-space to obtain first image feature projection vectors and the text feature vectors of the image regions in the first image into the sub-space to obtain text feature projection vectors, thereby maximizing covariance between the image features and the text features and the image feature vectors of the image regions in the second image into the sub-space to obtain second image feature projection vectors. The second storage module stores the first image feature projection vectors and the text feature projection vectors of the image regions. The graph building module establishes first links between the image regions based on the first image feature projection vectors, establishes second links between the image and the image regions of the image based on the operation of the image segmentation module, establishes third links between the image and the annotations of the image based on the image having the annotations, and establishes fourth links between the annotations based on the text feature projection vectors, calculates the weights of the first, the second, the third, and the fourth links, and obtains a graph showing a triangular relationship between the first image, the image regions, and the annotations, which is obtained by the first, the second, the third, and the fourth links and the weights of the links corresponding to these links and expressed by a matrix. The image update module adds the image node of the second image and the image region nodes of the second image to the graph built by the graph building module, establishes fifth links between the image region nodes of the second image and the image region nodes in the graph built by the graph building module based on the first image feature projection vectors and the second image feature projection vectors, establishes sixth links between the image node of the second image and the image region nodes of the second image, determines the weights of the fifth and the sixth links, and updates the graph expressed by the matrix based on the fifth and the sixth links and the weights of the links corresponding to the fifth and the sixth links. The annotation node acquisition module generates a restart vector corresponding to the second image and obtains a predetermined number of annotation nodes most closely related to the second image with the RWR algorithm based on the graph expressed by the updated matrix. The annotation module makes annotations on the second image using the keyword corresponding to the predetermined number of annotation nodes.

In the embodiment of the present invention, the image automatic annotation device applies preliminary processing (the dividing operation, the extraction of the image feature vectors of the image regions, and the projection of the image feature vectors) to the second image stand by for annotations based on the graph obtained by the image learning device. Since the preliminary processing uses the same method as the image learning device, the detailed description of the method is omitted here.

Next, the graph building module and the annotation node acquisition module of the image automatic annotation device are described in detail below.

As the function of the graph building module, the image node and the image region node of a standard standby image (i.e., retrieval data) are added to the built graph. The graph is expressed by a matrix, and the matrix is a symmetrically square-shaped matrix. Therefore, when the image node and the image region node are added to the matrix, a row and a column are added to the graph based on the matrix shown in FIG. 11. In other words, the image node and the image region node of the second image are added to the original matrix A as the row and the column of the matrix. Specifically, the image node and the image region node of the second image are newly added to the rows and the columns of the original matrix A as the new nodes, the links between the newly-added image region node and K1 pieces of the nearest image region nodes in the original graph are established, thereby adding the weights of the new links.

The element values of the updated matrix are determined by the links and the weights of the links.

Since the establishment of the links and the determination of the weights of the links are described above, their duplicated descriptions are omitted here.

Figure 12:
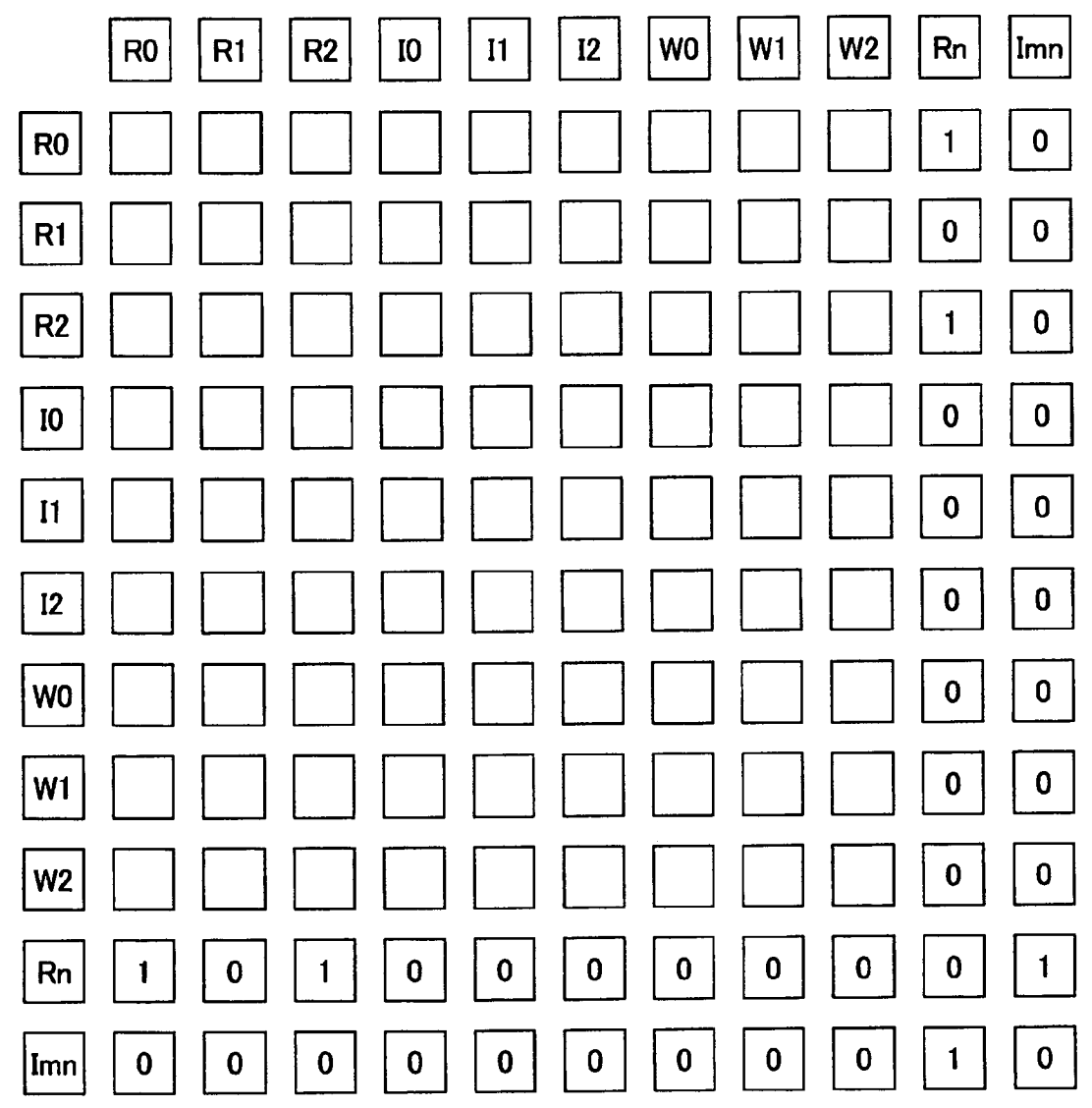

FIG. 12 shows the updated matrix.

In FIG. 12, the values of the matrix before being updated are not shown, but Rn represents a new image region node and Imn represents a node stand by for retrieval.

The restart vector corresponding to the second image is generated immediately after the update of the matrix. A predetermined number of annotation nodes most closely related to the second image are acquired based on the graph expressed by the updated matrix with the RWR algorithm, and a predetermined number of keywords corresponding to the annotation nodes are output.

Next, the generation of the restart vector is described.

When an image annotation is used as a retrieval amount in image retrieval, the element of an image retrieval node in the restart vector represents 1 and the remaining elements thereof represent 0.

Note that the processing steps of the RWR algorithm that specifies a predetermined number of most correlated keywords as target image annotations are described below.

In an initialization step, $U_0$ is set as the restart vector.

In a repetition step, $U_n+1=(1-c) AU_n+cV$ is repeatedly performed until stop conditions are met.

Here, n represents a repetition index, c represents a constant reflecting a restart probability, and A represents an adjacency matrix in the updated graph. Note that V represents the set restart vector. $U_n$ represents a state vector corresponding to a step n, and the value of the i-th element in this vector reflects the probability of reaching from a target node (newly-added image node) to a node i through n times of repetitions on the graph. In other words, it reflects a degree of correlation between the node corresponding to the i-th element and the target node, i.e., an extent how much they are closely related to each other.

In an extraction step, elements corresponding to annotation nodes in the state vector $U_n$ are extracted and arranged in descending order.

In an output step, a predetermined number of keywords corresponding to the annotation nodes are output one by one.

In the processing steps described above, an updated adjacency matrix is normalized in advance so as to converge after the RWR is repeated several times.

The normalization is performed in the following manner.

Method 1:

In the updated matrix A, respective element rows are divided by the sum of the element rows. Thus, the normalized adjacency matrix $\tilde{A}$ is expressed as follows.

$$\tilde{A} = AD^{-1/2}, D_{ij} = \sum_i A_{ij}, \text{ and } D_{ij} = 0 \text{ where } i \neq j$$

Method 2:

The adjacency matrix $\tilde{A}$ subjected to Laplacian normalization is expressed as follows.

$$\tilde{A} = D^{-1/2}AD^{-1/2}, D_{ij} = \sum_j A_{ij}, \text{ and } D_{ij} = 0 \text{ where } i \neq j$$

The normalization is not limited to the above methods, but other methods may also be employed.

Note that the RWR algorithm after the normalization operation performs the subsequent operations using the normalized adjacency matrix $\tilde{A}$, but the detailed descriptions of the operations are omitted here.

An image retrieval device according to the embodiment of the present invention is composed of the following modules when it is used for performing image retrieval at the input of a second image. In other words, the image retrieval device includes a first storage module, a reception module, an image segmentation module, a feature vector extraction module, a sub-space projection module, a second storage module, a graph building module, an image update module, a retrieval module, and an output module. The first storage module stores a first image having annotations and a group of annotation keywords, wherein the first image has one or more annotations obtained from the group of annotation keywords and describing the word meaning content of the first image. The reception module receives a second image stand by for retrieval. The image segmentation module performs a segmentation operation on the first and second images to segment them into one or more image regions. The feature vector extraction module extracts the image feature vectors of the image regions in the first image from image features, the text feature vectors of the image regions in the first image from text features, and the image feature vectors of the image regions in the second image from the image features, thereby extracting the feature vectors that eliminate information and noise unnecessary for the image and grasp an essential content. The sub-space projection module projects the image feature vectors of the image regions in the first image into a sub-space to obtain first image feature projection vectors and the text feature vectors of the image regions in the first image into the sub-space to obtain text feature projection vectors, thereby maximizing covariance between the image features and the text features and the image feature vectors of the image regions in the second image into the sub-space to obtain second image feature projection vectors. The second storage module stores the first image feature projection vectors and the text feature projection vectors of the image regions. The graph building module establishes first links between the image regions based on the first image feature projection vectors, establishes second links between the image and the image regions of the image based on the operation of the image segmentation module, establishes third links between the image and the annotations of the image based on the image having the annotations, and establishes fourth links between the annotations based on the text feature projection vectors, calculates the weights of the first, the second, the third, and the fourth links, and obtains a graph showing a triangular relationship between the first image, the image regions, and the annotations, which is obtained by the first, the second, the third, and the fourth links and the weights of the links corresponding to these links and expressed by a matrix. The image update module adds the image node of the second image and the image region nodes of the second image to the graph built by the graph building module, establishes fifth links between the image region nodes of the second image and the image region nodes in the graph built by the graph building module based on the first image feature projection vectors and the second image feature projection vectors, establishes sixth links between the image node of the second image and the image region nodes of the second image, determines the weights of the fifth and the sixth links, and updates the graph expressed by the matrix based on the fifth and the sixth links and the weights of the links corresponding to the fifth and the sixth links. The retrieval module generates a restart vector corresponding to the second image and obtains a predetermined number of annotation nodes most closely related to the second image with the RWR algorithm based on the graph expressed by the updated matrix. The output module outputs the first image corresponding to the predetermined umber of image nodes.

The image retrieval device according to the embodiment of the present invention is almost similar to the image automatic annotation device except for an output result. Therefore, the description of the image retrieval device is omitted here.

The image retrieval device according to the embodiment of the present invention is composed of the following modules when it is used for performing image retrieval at the input of a second image and a keyword. In other words, the image retrieval device includes a first storage module, a reception module, an image segmentation module, a feature vector extraction module, a sub-space projection module, a second storage module, a graph building module, an image update module, a retrieval module, and an output module. The first storage module stores a first image having annotations and a group of annotation keywords, wherein the first image has one or more annotations obtained from the group of annotation keywords and describing the word meaning content of the first image. The reception module receives a second image stand by for retrieval and the keyword. The image segmentation module performs a segmentation operation on the first and second images to segment them into one or more image regions. The feature vector extraction module extracts the image feature vectors of the image regions in the first image from image features, the text feature vectors of the image regions in the first image from text features, and the image feature vectors of the image regions in the second image from the image features, thereby extracting the feature vectors that eliminate information and noise unnecessary for the image and grasp an essential content. The sub-space projection module projects the image feature vectors of the image regions in the first image into a sub-space to obtain first image feature projection vectors and the text feature vectors of the image regions in the first image into the sub-space to obtain text feature projection vectors, thereby maximizing covariance between the image features and the text features and the image feature vectors of the image regions in the second image into the sub-space to obtain second image feature projection vectors. The second storage module stores the first image feature projection vectors and the text feature projection vectors of the image regions. The graph building module establishes first links between the image regions based on the first image feature projection vectors, establishes second links between the image and the image regions of the image based on the operation of the image segmentation module, establishes third links between the image and the annotations of the image based on the image having the annotations, and establishes fourth links between the annotations based on the text feature projection vectors, calculates the weights of the first, the second, the third, and the fourth links, and obtains a graph showing a triangular relationship between the first image, the image regions, and the annotations, which is obtained by the first, the second, the third, and the fourth links and the weights of the links corresponding to these links and expressed by a matrix. The image update module adds the image node of the second image and the image region nodes of the second image to the graph built by the graph building module, establishes fifth links between the image region nodes of the second image and the image region nodes in the graph built by the graph building module based on the first image feature projection vectors and the second image feature projection vectors, establishes sixth links between the image node of the second image and the image region nodes of the second image, determines the weights of the fifth and the sixth links, and updates the graph expressed by the matrix based on the fifth and the sixth links and the weights of the links corresponding to the fifth and the sixth links. The retrieval module generates a restart vector corresponding to the second image and obtains a predetermined number of annotation nodes most closely related to the second image and a retrieval keyword with the RWR algorithm based on the graph expressed by the updated matrix. The output module outputs the first image corresponding to the predetermined number of image nodes.

The image retrieval device according to the embodiment of the present invention is almost similar to the image automatic annotation device except for an output result and a restart vector.

The restart vector has two parts for an image and a keyword. An element at k corresponding to an image retrieval node and an annotation node represents 1, and the remaining elements represent 0.

The image retrieval device according to the embodiment of the present invention is composed of the following modules when it is used for performing image retrieval at the input of a retrieval keyword.

In other words, the image retrieval device according to the embodiment of the present invention includes a first storage module, a reception module, an image segmentation module, a feature vector extraction module, a sub-space projection module, a second storage module, a graph building module, a retrieval module, and an output module. The first storage module stores a first image having annotations and a group of annotation keywords, wherein the first image has one or more annotations obtained from the group of annotation keywords and describing the word meaning content of the first image.

The reception module receives the keywords for retrieval. The image segmentation module performs a segmentation operation on the first image to segment it into one or more image regions. The feature vector extraction module extracts the image feature vectors of the image regions in the first image from image features and the text feature vectors of the image regions in the first image from text features, thereby extracting the feature vectors that eliminate information and noise unnecessary for the image and grasp an essential content. The sub-space projection module projects the image feature vectors of the image regions in the first image into a sub-space to obtain first image feature projection vectors and the text feature vectors of the image regions in the first image into the sub-space to obtain text feature projection vectors, thereby maximizing covariance between the image features and the text features. The second storage module stores the first image feature projection vectors and the text feature projection vectors of the image regions. The graph building module establishes first links between the image regions based on the projected first image feature projection vectors, establishes second links between the image and the image regions of the image based on the operation of the image segmentation module, establishes third links between the image and the annotations of the image based on the image having the annotations, and establishes fourth links between the annotations based on the text feature projection vectors, calculates the weights of the first, the second, the third, and the fourth links, and obtains a graph showing a triangular relationship between the first image, the image regions, and the annotations, which is obtained by the first, the second, the third, and the fourth links and the weights of the links corresponding to these links and expressed by a matrix. The retrieval module generates a restart vector corresponding to the retrieval keyword and obtains a predetermined number of image nodes most closely related to the retrieval keyword with the RWR algorithm based on the graph expressed by the updated matrix. The output module outputs the first image corresponding to the predetermined number of image nodes.

In the embodiment of the present invention, the outputs of a predetermined number of keywords and the first image with the image automatic annotation device and the image retrieval device can be performed by plural methods. Next, the methods are described in detail below.

After a vector U is converged and stabilized, values (probability of reaching from a target node to a node) corresponding to respective nodes in the graph are arranged one by one depending on node types (image nodes, image region nodes, and annotation nodes).

In image annotations, all the elements in the vector U corresponding to the annotation nodes in the graph are taken and arranged descendingly in the order of probability. Among the elements, first p pieces of keywords are determined to be annotations most correlated to a retrieval image.

In image retrieval, all the elements in the vector U corresponding to the annotation nodes in the graph are taken and arranged descendingly in the order of probability. Among the elements, first p pieces of images are determined to be images most correlated to retrieval (a text or an image, or both of the text and the image).

Here, p is determined in the following manner.

Namely, p is automatically determined when a certain constant is set, or it is determined by correlation probability.

In the latter case, p is calculated as follows.

That is, p is obtained when the cumulative probability of first p pieces of outputs (annotations or retrieval) is greater than a threshold th1, or when a difference between the probability of the p-th output (annotation or retrieval) and that of the (p+1)-th output is greater than a threshold th2.

p can be determined by methods other than the above methods, but the detailed descriptions of the methods are omitted here.

Figure 14:
FIG. 14 is an input image for making automatic annotations in the embodiment of the present invention.

FIG. 14 is the drawing of a man and a woman in a room. FIG. 14 shows a case in which the embodiment of the present invention is applied to an input image on which annotations are automatically made. When the image shown in FIG. 14 is input, an interior, persons, a woman, and a man are obtained as annotation.

Figure 15:
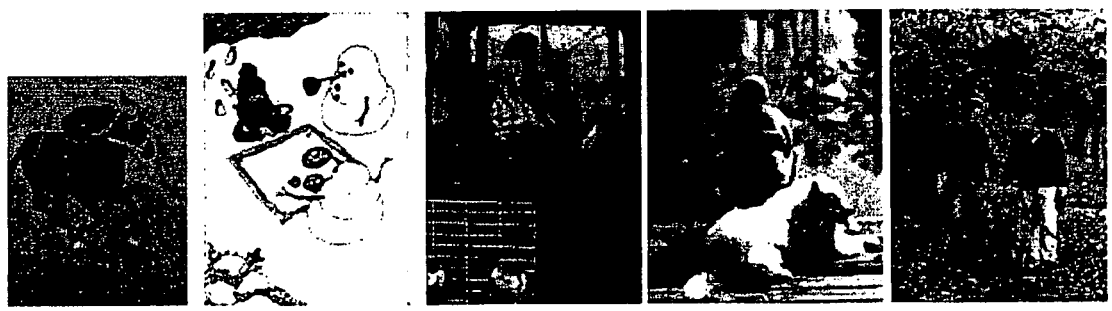
FIG. 15 is an illustration showing retrieval results obtained when "a person and an animal" are input texts in the embodiment of the present invention.

FIG. 15 has four drawings each having at least one person and animal. FIG. 15 shows retrieval results obtained by the image retrieval device and the image retrieval method according to the embodiment of the present invention when "a person and an animal" are input.

Figure 16:
FIG. 16 is an illustration showing retrieval results obtained when an image is input in the embodiment of the present invention.

FIG. 16 has three drawings in which three children play with wooden bricks and one drawing of a person skiing. FIG. 16 shows retrieval results obtained by the image retrieval device and the image retrieval method according to the embodiment of the present invention when an image is input. In FIG. 16, the leftmost image is input, and the remaining three right images are output.

Figure 17:
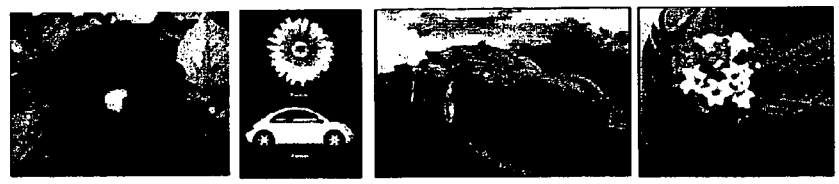
FIG. 17 is an illustration showing retrieval results when a text and an image are input in the embodiment of the present invention.

FIG. 17 has one drawing including a flower and a text and three drawings each having a flower and an automobile. FIG. 17 shows retrieval results obtained by the embodiment of the present invention when a text and an image are input. In FIG. 17, the leftmost image is an input image, and the remaining three right images are output results.

When the descriptions regarding FIGS. 14 through 16 and these figures are put together in actual images, the method and the device according to the embodiment of the present invention can satisfactorily implement automatic annotation and retrieval of images.

According to the embodiment of the present invention, the following useful advantages can be obtained.

1) In the image learning, the automatic annotation, the retrieval method, and the device according to the embodiment of the present invention, the image feature vectors and the text feature vectors are projected into the same sub-space in the learning stage to maximize the covariance between the image feature and the text feature, thereby reducing the dimensions of the image feature and the text feature. Thus, graph building speed, annotation speed, and retrieval speed can be accelerated. Also, consistency between image data and text data can be enhanced. Accordingly, the graph can be built more robustly, which in turn provides higher image annotation accuracy and image retrieval accuracy.

2) In the image learning, the automatic annotation, the retrieval method, and the device according to the embodiment of the present invention, the canonical covariance sub-space is used as a sub-space so that image regions having similar images can be more closely related to each other. Thus, an error in the nearest link between the image region nodes can be reduced.

3) In the image learning, the automatic annotation, the retrieval method, and the device according to the embodiment of the present invention, the larger a difference in images between the image region nodes corresponding to the link is, the smaller weight value of the link becomes. Therefore, compared with the image region node having a relatively larger image difference, an influence on the current image region node becomes small. Thus, accurate annotations and/or retrieval results can be reliably output even after plural accesses with the RWR algorithm.

4) In the image learning, the automatic annotation, the retrieval method, and the device according to the embodiment of the present invention, when the image region nodes are linked with each other, the larger the appearances of the image region node corresponding to the link is, the smaller the weight of the link becomes. Therefore, more accurate automatic annotation can be made preventing biasing to frequently-used words.

The present invention is not limited to the specifically disclosed embodiments, and variations and modifications may be made without departing from the scope of the present invention.

The present application is based on Chinese Priority Application No. 200810100721, filed on May 20, 2008, the entire contents of which are hereby incorporated herein by reference.

What is claimed is:

1. An image learning method comprising:
   performing a segmentation operation on a first image having annotations to segment the first image into one or more image regions;
   extracting image feature vectors and text feature vectors from all the image regions to obtain an image feature matrix and a text feature matrix;
   projecting the image feature matrix and the text feature matrix into a sub-space so as to maximize covariance between an image feature and a text feature, thereby obtaining the projected image feature matrix and the text feature matrix;
   storing the projected image feature matrix and the text feature matrix;
   establishing first links between the image regions based on the projected image feature matrix;
   establishing second links between the first image and the image regions based on a result of the segmentation operation;
   establishing third links between the first image and the annotations based on the first image having the annotations;
   establishing fourth links between the annotations based on the projected text feature matrix;
   calculating weights of all the links;
   obtaining a graph showing a triangular relationship between the first image, the image regions, and the annotations based on all the links and the weights of the links corresponding to the links; and
   providing a storage device and a processor, and wherein the step of storing the projected image feature and text feature matrices includes the step of storing information in the storage device, and wherein the step of calculating weights includes the step of using the processor.

2. The image learning method according to claim 1, wherein, in the segmentation operation, the first image is segmented into rectangular blocks, multi-resolution quad-tree sub-blocks, or non-overlapping homogeneous regions with an image segmentation algorithm.

3. The image learning method according to claim 1, wherein the image feature vectors of all the image regions are extracted by an algorithm based on a local binary pattern feature comprising mixed colors and pattern information.

4. The image learning method according to claim 1, wherein the sub-space is a canonical covariance sub-space.

5. The image learning method according to claim 1, wherein the first image, the image regions, and the annotations are represented by nodes in the graph, the graph is represented by an adjacency matrix, the links between the nodes are represented by the weights of the links in the graph, and a value of a corresponding weight represents 0 if there is no link between the nodes.

6. The image learning method according to claim 5, wherein, in the first link, the larger a difference in image between the image region nodes corresponding to a sub-link is, the smaller weight value of the sub-link becomes, and/or in the third link, the larger the number of appearances of the annotation node corresponding to the sub-link is, the smaller the weight value of the sub-link becomes, and/or in the fourth link, the larger similarity in text between the annotation nodes corresponding to the sub-link is, the smaller the weight value of the sub-link becomes.

7. An image automatic annotation method for making an annotation on an input second image, the image automatic annotation method comprising the learning method according to claim 1, a preliminary processing step, a graph update step, and an annotation step,
   wherein the preliminary processing step includes: receiving the second image; performing the segmentation operation on the second image to segment the second image into one or more image regions; extracting image feature vectors from all the image regions to obtain an image feature matrix of the second image; and projecting the image feature matrix into the sub-space to obtain a projected image feature matrix of the second image,
   the graph update step includes: establishing fifth links between the image region nodes of the second image and the image region nodes in the graph based on the projected first image feature matrix and the second image feature matrix; establishing sixth links between the second image and the image region nodes based on a result of the segmentation operation; determining weights of the links of the fifth links and the sixth links; and updating the graph based on the fifth links and the sixth links and the weights of the links corresponding to the fifth links and the sixth links, and
   the annotation step includes: generating a restart vector corresponding to the second image; acquiring a predetermined number of annotations most closely related to the second image with a random walk with restart; and making the annotations on the second image using keywords corresponding to the predetermined number of annotations.

8. The image automatic annotation method according to claim 7, wherein, in the segmentation operation, the first image and the second image are segmented into rectangular blocks, multi-resolution quad-tree sub-blocks, or non-overlapping homogeneous regions with an image segmentation algorithm.

9. The image automatic annotation method according to claim 7, wherein the image feature vectors of all the image regions are extracted by an algorithm based on a local binary pattern feature comprising mixed colors and pattern information.

10. The image automatic annotation method according to claim 7, wherein the sub-space is a canonical covariance sub-space.

11. The image automatic annotation method according to claim 7, wherein the first image, the second image, the image regions, and the annotations are represented by nodes in the graph, the graph is represented by an adjacency matrix, the links between the nodes are represented by the weights of the links in the graph, and a value of a corresponding weight represents 0 if there is no link between the nodes.

12. The image automatic annotation method according to claim 11, wherein, in the first link, the larger a difference in image between the image region nodes corresponding to a sub-link is, the smaller weight value of the sub-link becomes, and/or in the third link, the larger the number of appearances of the annotation nodes corresponding to the sub-link is, the smaller the weight value of the sub-link becomes, and/or in the fourth link, the larger similarity in text between the annotation nodes corresponding to the sub-link is, the smaller the weight value of the sub-links becomes.

13. The image automatic annotation method according to claim 11, further comprising: a step of applying normalization to the updated adjacency matrix before performing the annotation step based on the adjacency matrix subjected to the normalization.

14. An image retrieval method for retrieving an image when a retrieval keyword is input, the image retrieval method comprising the learning method according to claim 1 and a retrieval step, wherein the retrieval step includes: generating a restart vector corresponding to the retrieval keyword; and acquiring and outputting a predetermined number of images most closely related to the retrieval keyword with a random walk with restart.

15. An image learning device comprising:
an image segmentation module that performs a segmentation operation on a first image having annotations to segment the first image into one or more image regions;
a feature vector extraction module that extracts image feature vectors and text feature vectors from all the image regions to obtain an image feature matrix and a text feature matrix;
a sub-space projection module that projects the image feature matrix and the text feature matrix into a sub-space so as to maximize covariance between an image feature and a text feature, thereby obtaining the projected image feature matrix and the text feature matrix;
a storage device, and a storage module that stores the projected image feature matrix and the text feature matrix; and
a processor, and a graph building module that establishes first links between the image regions based on the projected image feature matrix; establishes second links between the first image and the image regions based on a result of the segmentation operation; establishes third links between the first image and the annotations based on the first image having the annotations; establishes fourth links between the annotations based on the projected text feature matrix; calculates weights of all the links; and obtains a graph showing a triangular relationship between the first image, the image regions, and the annotations based on all the links and the weights of the links corresponding to the links.

16. An image automatic annotation device for making an annotation on an input second image, the image automatic annotation device comprising the image learning device according to claim 15, a preliminary processing module, a graph update module, and an annotation module,
wherein the preliminary processing module includes: a unit that receives the second image; a unit that performs the segmentation operation on the second image to segment the second image into one or more image regions; a unit that extracts image feature vectors from all the image regions to obtain an image feature matrix of the second image; and a unit that projects the image feature matrix of the second image into the sub-space to obtain a projected image feature matrix of the second image,
the graph update module includes: a unit that establishes fifth links between the image region nodes of the second image and the image region nodes in the graph based on the projected first image feature matrix and the second image feature matrix and establishes sixth links between the second image and the image region nodes based on a result of the segmentation operation; a unit that determines weights of the links of the fifth links and the sixth links; and a unit that updates the graph based on the fifth links and the sixth links and the weights of the links corresponding to the fifth links and the sixth links, and
the annotation module includes: a unit that generates a restart vector corresponding to the second image and acquires a predetermined number of annotations most closely related to the second image with a random walk with restart; and a unit that makes the annotations on the second image using keywords corresponding to the predetermined number of annotations.

17. An image retrieval device for retrieving an input second image, the image retrieval device comprising the learning device, the preliminary processing module, the graph update module according to claim 16, and a retrieval module, wherein the retrieval module includes: a unit that generates a restart vector corresponding to the second image and acquires a predetermined number of images most closely related to the second image with a random walk with restart.

18. An image retrieval device used for retrieving an image when a retrieval keyword is input, the image retrieval device comprising the image learning device according to claim 15 and a retrieval module, wherein the retrieval module includes: a unit that generates a restart vector corresponding to the retrieval keyword and acquires a predetermined number of images most closely related to the retrieval keyword with a random walk with restart.

19. An image retrieval method based on an input second image, the image retrieval method comprising a learning step, a preliminary processing step, a graph update step, and a retrieval step,
wherein the learning step includes: performing a segmentation operation on a first image having annotations to segment the first image into one or more image regions; extracting image feature vectors and text feature vectors from all the image regions to obtain an image feature matrix and a text feature matrix; projecting the image feature matrix and the text feature matrix into a sub-space so as to maximize covariance between an image feature and a text feature, thereby obtaining the projected image feature matrix and the text feature matrix; providing a storage device, and storing the projected image feature matrix and the text feature matrix, wherein the step of storing the projected image feature matrix and the text feature matrix occurs subsequent to the step of providing the storage device; establishing first links between the image regions based on the projected image feature matrix; establishing second links between the first image and the image regions based on a result of the segmentation operation; establishing third links between the first image and the annotations based on the first image having the annotations; establishing fourth links between the annotations based on the projected text feature matrix; calculating weights of all the links; and obtaining a graph showing a triangular relationship between the first image, the image regions, and the annotations based on all the links and the weights of the links corresponding to the links,
the preliminary processing step includes: receiving the second image; performing the segmentation operation on the second image to segment the second image into one or more image regions; extracting image feature vectors from all the image regions to obtain an image feature matrix of the second image; and projecting the image feature matrix into the sub-space to obtain a projected image feature matrix of the second image, the graph update step includes: establishing fifth links between the image region nodes of the second image and the image region nodes in the graph based on the projected first image feature matrix and the second image feature matrix; establishing sixth links between the second image and the image region nodes based on a result of the segmentation operation; determining weights of the links of the fifth links and the sixth links; and updating the graph based on the fifth links and the sixth links and the weights of the links corresponding to the fifth links and the sixth links, and the retrieval step includes: generating a restart vector corresponding to the second image; and acquiring and outputting a predetermined number of annotations most closely related to the second image with a random walk with restart.

20. The image retrieval method according to claim 19, wherein a keyword is further input, and in the retrieval step, the restart vector corresponding to the second image and the keyword is generated and a predetermined number of images most closely related to the second image and the keyword are acquired and output based on the updated graph.

* * * * *

UNITED STATES PATENT AND TRADEMARK OFFICE
CERTIFICATE OF CORRECTION

PATENT NO.        : 8,232,996 B2
APPLICATION NO.   : 12/468423
DATED             : July 31, 2012
INVENTOR(S)       : Timothee Bailloeul et al.

Page 1 of 1

It is certified that error appears in the above-identified patent and that said Letters Patent is hereby corrected as shown below:

On the title page: Item (75) Inventors:

Third inventor Yinghui Xu's name was misspelled. It should be "Yinghui Xu", not Yinghul Xu.

Signed and Sealed this
Eighteenth Day of December, 2012

David J. Kappos
*Director of the United States Patent and Trademark Office*